United States Patent [19]

Eggen

[11] 4,156,030

[45] May 22, 1979

[54] COCOA SHELL EXTRACT

[75] Inventor: Ingmar B. Eggen, New Milford, Conn.

[73] Assignee: Societe d'Assistance Technique pour Produits Nestle S.A., Lausanne, Switzerland

[21] Appl. No.: 865,622

[22] Filed: Dec. 29, 1977

[51] Int. Cl.² .................. A23G 1/00; A23L 1/221; A23L 1/27

[52] U.S. Cl. ............................ 426/540; 426/650; 426/655; 426/429; 426/430

[58] Field of Search ............... 426/650, 655, 540, 429, 426/430

[56] References Cited

U.S. PATENT DOCUMENTS

| | | | |
|---|---|---|---|
| 2,512,663 | 6/1950 | Massourovsky | 426/429 X |
| 2,899,309 | 8/1959 | Rusoff | 426/655 X |
| 3,392,027 | 7/1968 | Hess | 426/655 X |

*Primary Examiner*—Joseph M. Golian
*Attorney, Agent, or Firm*—Watson, Leavenworth, Kelton & Taggart

[57] ABSTRACT

An extract is prepared by treating cocoa shells with acidified ethanol. Other features of the invention appear in the following specification.

8 Claims, No Drawings

COCOA SHELL EXTRACT

The present invention is concerned with a flavouring and colouring material extracted from the shells or husks of cocoa beans.

In the processing of cocoa beans, the shells are removed after roasting, usually by winnowing techniques. Hitherto there has been little economic use for the shells, and they have generally been disposed of as refuse or burnt.

It has now been found that a water-soluble flavouring and colouring material may be prepared by extracting the shells with acidified ethanol. The extracted material has a berry-like taste and a characteristic colour and is especially suitable for incorporation in soft drinks, especially carbonated beverages.

According to the invention, a process for preparing a cocoa shell extract comprises extracting cocoa shells with an acidified ethanol solution and separating the resulting extract from the cocoa shell residues.

The ethanol may be acidified with any non-toxic acid. Preferred acids are hydrochloric acid, phosphoric acid, and organic acids such as tartaric acid and citric acid. Hydrochloric acid leads to an extract having a desirable characteristic red colour.

The acidified ethanol solution preferably contains 85 to 90%, advantageously 85 to 87% of ethanol and the balance acid. Extraction is preferably performed under reflux and the cocoa shells are preferably first ground to a particle size of from 50 to 1000 microns, advantageously 200 to 400 microns. Under the above preferred conditions, a reaction time within the range 30 minutes to 2 hours gives a highly satisfactory extract.

Extraction produces a liquid phase containing acid, ethanol and the extracted components mixed with a residual sludge. After cooling the mixture, the liquid phase is separated from the sludge, preferably in a filter press, and the sludge is discarded. Generally the bulk of the ethanol is removed from the extract to give a concentrated flavouring extract and this is advantageously achieved by distillation, which is preferably performed at atmospheric pressure. The residual extract after distillation typically contains about 5% by weight of ethanol and has a solids content of from 30 to 50%.

The separated sludge contains a considerable portion of ethanol and this is advantageously recovered by distilling the residue. The ethanol so obtained is normally combined with that recovered from the extract and may be used for extracting a fresh batch of cocoa shells.

While the scope of the invention is not to be limited by theoretical considerations, it is believed that the ethanol/acid solution acts not only as a solvent for the flavouring and colouring components but also as a hydrolytic or alcoholytic and esterifying and transesterifying agent. Thus a number of components are obtained in the extract which are not present as such in the cocoa shells, at least in monomeric form and these compounds contribute to the characteristic colours and flavours obtained.

The liquid extracts obtained by the process of the invention may be used in a number of ways. When the concentrated extract is added to water, preferably carbonated, in quantities of the order of 0.3 to 0.9% by weight a highly satisfactory soft drink is obtained. The flavour is further improved by the addition of sugar, citric acid, etc.

The flavouring can be used in either liquid or powder form. When used in the liquid phase the concentrated liquid extract is preferably mixed with water and sugar to give a stable easily-dispersed syrup which may be added to about 6 times its bulk of water, according to taste. The syrup typically contains 7½ parts by weight sucrose and 6½ parts by weight liquid invert sugar to 1 part concentrated extract. After mixing with water the beverage may be centrifuged to give an improved sparkling appearance.

The extract may equally be used in the solid form. The concentrated liquid extract is mixed with powdered solid material, typically about nine times its weight of sugar and other solids and the mixture is agglomerated and dried, for example in a fluidised bed drier. The resulting powder is mixed with about 8 times its own weight of water according to taste. An effervescent powder may be made by incorporating sodium bicarbonate and a solid acid such as citric acid. The powder may, if desired, be pressed into tablets.

The extract according to the invention may also be used as a flavouring and colouring material for various confectionery and ice-cream products. For example, the extract may be incorporated in confectionery coatings which typically contain 30 to 35% fat, at a level of 1.5 to 3.0%. In addition the extract may further be used in gelatine-type desserts, chocolate pudding (tinted red), baked pudding (coloured and flavoured), ribbon candy (coloured and flavoured), dietetic coating (coloured or flavoured), dark chocolate coating (coloured or flavoured), chocolate cake frosting (tinted red), and cake frosting and filling (coloured and flavoured).

The following Examples are given only for the purpose of illustrating the invention. All parts and percentages are by weight.

EXAMPLE 1

The shells are separated from roasted cocoa beans and coarse ground in a mill to give a particle size of 200 to 800 microns.

One part of the ground shells is then extracted with 3 parts of a mixture comprising 13% concentrated hydrochloric acid (37%) and 87% ethanol. The mixture is refluxed under atmospheric pressure for about 90 minutes, to give a mixture of liquid cocoa bean shell extract and a sludge containing the insoluble residue from the shells.

The mixture is then filtered in a filter press to yield about 1.5 parts of clear extract and about 2.5 parts of residual sludge.

The sludge contains a considerable amount of alcohol even after filtering and this alcohol is preferably recovered by distillation. A conventional still may be used and the condensed alcohol may be recycled. A typical batch of 2.5 parts of sludge yields 1 to 1.5 parts of alcohol.

To obtain a non-alcoholic extract, the alcohol is evaporated from the extract to give a concentrated extract containing the colouring and flavouring material and residual acid. The solids content of the concentrated extract is about 35 to 40% and a batch of 1.5 parts by weight of alcoholic extract yields 0.5–0.75 parts by weight alcohol and 0.75–1 parts by weight concentrated extract.

EXAMPLE 2

A syrup base for a carbonated beverage is prepared from:

| | |
|---|---|
| Sugar | 7.51 parts |
| Liquid invert syrup | 6.51 parts |
| Water | 3.75 parts |
| Concentrated cocoa bean shell extract | 1.07 parts |

For preparing a beverage, the syrup is mixed with 0.36 parts of 10% phosphoric acid, 5.00 parts stabiliser (Viscarin No. 402, 270 mesh, 1% soln.) and 79.80 parts of carbonated water.

EXAMPLE 3

A mixture is made of 10% concentrated cocoa bean shell extract, 87% sugar and 3% citric acid. The ingredients are mixed, and dried in a fluidised bed drier. When mixed with 8 times its weight of water, this powder gives a pleasant non-carbonated beverage.

EXAMPLE 4

A mixture is made of 10% concentrated cocoa bean shell extract, 84% sugar, 3% citric acid and 3% sodium bicarbonate. The ingredients are mixed and agglomerated as in Example 3. When dissolved in 8 times its weight of water this powder gives an effervescent soft drink.

This mixture may also be pressed into tablets for more convenient packing and handling.

EXAMPLE 5

15 to 30 parts by weight of the concentrated cocoa bean shell extract are mixed with 1000 parts by weight of a vegetable fat or cocoa butter coating and the viscosity is adjusted by adding vegetable fat and/or cocoa butter. The mixture is refined to give a product which is easily moulded. Other flavours, e.g. Maraschino cherry may be added as desired to give a confectionery coating composition.

The approximate compositions of the fat and cocoa butter coating obtained are as follows:

| | Vegetable fat coating | Cocoa butter coating |
|---|---|---|
| Milk solids | 20 parts | 28 parts |
| Suguar | 51 | 43 |
| Fat | 28 | — |
| Cocoa butter | — | 28 |
| Lecithin | 0.5 | — |
| Water | 0.5 | 0.7 |
| Flavours | 0.03 | 0.03 |
| Cocoa bean shell extract | 1.5–3.0 | 1.5–3.0 |

EXAMPLE 6

A canned retorted gelatine dessert based on cocoa bean shell extract flavour may be prepared from the following ingredients:

| | |
|---|---|
| Concentrated cocoa bean shell extract | 50.0 parts |
| Granulated sugar | 350.0 |
| Locust bean gum | 2.4 |
| Carrageenans | 2.4 |
| Ascorbic acid | 0.7 |
| Salt | 0.5 |
| Calcium sulfate | 0.5 |
| Water | 493.5 |

The dry ingredients are blended, mixed in water at 38° C. and the resulting slurry is filled into cans. The cans are closed and retorted at 99° C. for about 10 minutes after which the cans are cooled quickly to 18° to 21° C. and stored. The gelled dessert is ready to eat from the can or may be chilled if desired.

I claim:

1. A process for preparing a berry-like flavorant and colorant cocoa shell extract, which comprises extracting cocoa shells with an acidified ethanol solution and separating the resulting extract from the cocoa shell residue.

2. A process according to claim 1, in which the cocoa shells are of an average particle size from 50 to 1000 microns.

3. A process according to claim 1, in which the extraction is carried out at the reflux temperature of the ethanol solution for a period in the range 30 minutes to 2 hours.

4. A process according to claim 1, in which the acidified ethanol solution contains 85 to 90% ethanol and 10 to 15% of an acid.

5. A process according to claim 4, in which the acid is hydrochloric, phosphoric, citric or tartaric acid.

6. A process according to claim 1, in which ethanol is removed from the extract to produce a concentrated extract.

7. A process according to claim 6, in which the concentrated extract is dried to a solid.

8. A flavoring and coloring extract of cocoa shells prepared by the process of claim 1.